(12) United States Patent
Ross (10) Patent No.: US 7,815,476 B1
(45) Date of Patent: Oct. 19, 2010

(54) AMPHIBIOUS UTILITY TRAILER THAT RECEIVES MARINE PROPULSIVE POWER AND/OR STEERING CONTROL FROM A FERRIED VEHICLE

(76) Inventor: Clyde M. Ross, 101 Hall Dr., Leechburg, PA (US) 15656

(*) Notice: Subject to any disclaimer, the term of this patent is extended or adjusted under 35 U.S.C. 154(b) by 0 days.

(21) Appl. No.: 11/727,318

(22) Filed: Mar. 26, 2007

(51) Int. Cl.
*B63H 21/175* (2006.01)
(52) U.S. Cl. ......................................... 440/11; 114/344
(58) Field of Classification Search ................... 440/11, 440/12
See application file for complete search history.

(56) References Cited

U.S. PATENT DOCUMENTS

| 10,790 | A | * | 4/1854 | Cathcart | .................. 440/51 |
| 1,495,726 | A | * | 5/1924 | Cook et al. | .................... 440/11 |
| 2,282,745 | A | * | 5/1942 | Preston | ........................ 440/11 |
| 2,342,535 | A | * | 2/1944 | Frova | ........................... 440/11 |
| 3,076,425 | A | * | 2/1963 | Anderson | ..................... 440/11 |
| 3,428,016 | A | * | 2/1969 | Holm | ....................... 440/12.54 |
| 3,599,593 | A | * | 8/1971 | Fleming | ....................... 440/11 |
| 3,903,831 | A |  | 9/1975 | Bartlett et al. |  |
| 5,688,151 | A | * | 11/1997 | Hanz | ............................ 440/11 |
| 6,443,088 | B1 | * | 9/2002 | Putman et al. | ............... 114/343 |
| 6,663,130 | B1 |  | 12/2003 | Dray |  |
| 6,851,382 | B2 |  | 2/2005 | Carter |  |
| 7,021,228 | B2 |  | 4/2006 | Robb |  |
| 2002/0002939 | A1 |  | 1/2002 | Beauchesne et al. |  |
| 2002/0134295 | A1 |  | 9/2002 | Chimato |  |
| 2006/0063439 | A1 |  | 3/2006 | Krucker |  |
| 2007/0243774 | A1 | * | 10/2007 | Hebert et al. | .................. 440/11 |

* cited by examiner

*Primary Examiner*—Ed Swinehart
(74) *Attorney, Agent, or Firm*—Harbin & Hein PLLC (57) ABSTRACT

An amphibious utility trailer to haul a load over land and/or to ferry a motorized vehicle over water. The trailer is adapted to receive marine propulsive power and/steering control from wheel torque and/or steering mechanism of a vehicle, such as an ATV. A propulsor such as a paddle wheel, propeller, or water jet propels the trailer through water when engaged with ATV wheel torque. A friction coupling such as a treadmill or set of rollers in the trailer bed removably interconnects the propulsor with ATV tires. The trailer may also include a rudder operable through a removable coupling with the ATV handlebars to steer the trailer in water. The arrangement enables the trailer to be "driven" over water utilizing the ATV and yet still provide a plain and simple utility trailer for hauling traditional items over land.

21 Claims, 6 Drawing Sheets

AMPHIBIOUS UTILITY TRAILER THAT RECEIVES MARINE PROPULSIVE POWER AND/OR STEERING CONTROL FROM A FERRIED VEHICLE

BACKGROUND

This invention relates to a transport vehicle, but more specifically, to an amphibious utility trailer that conventionally hauls a load over and also ferries a vehicle when underway across a waterway.

In the sports and recreational field, there is often a need to extend the usefulness of an all terrain vehicle (ATV) or other land vehicle over various waterways, such as rivers, lakes, and the like. Prior solutions include providing a ferry vessel to transport the ATV over water, and in a recent development, providing floatation gear that is removably attached to the land vehicle itself. An illustration of the latter concept is disclosed in U.S. Pat. Publication 2006/0063439 by Krucker, which discloses detachable pontoons for an ATV where the pontoons themselves include detachable trailer wheels and a telescoping tongue to permit land towing. When attached to the ATV, propulsion is provided by the submerged tread grips of the ATV tires, or alternatively, is provided by a separate outboard motor attached to a frame supporting the pontoon floats.

U.S. Pat. Publication 2002/0134295 to Chimato discloses an amphibious trailer suitable for towing a load within a cabin thereof over land or water; however, it too includes a separate outboard or similar motor for marine propulsion.

It is more advantageous, however, to provide a utility trailer having a traditional land-towing capability for hauling a load or a vehicle and yet also provide amphibious operation to ferry a vehicle over water. Prior apparatuses addressing the combination of land hauling and marine ferrying capabilities are disclosed, for example, by U.S. Pat. No. 6,861,382 to Carter and by U.S. Pat. No. 7,021,228 to Robb. Each discloses a floating trailer towable through water by a boat, as well as being towable over land by a tow vehicle. These trailers, however, either lack power in their land or water-towable configuration or require a separate engine for marine propulsion. In a more recent development disclosed in U.S. Pat. Publication 2002/0002939 to Beauchesne et al., there is disclosed an amphibious hull having a single engine to provide both land and marine locomotion. Overall, prior apparatuses tend to be specialty trailers having little or no practical utility for the needs of everyday life.

Thus, it is an objective of the present invention to provide an amphibious utility trailer to haul a vehicle or other load over land and that ferries the vehicle over water where the ferried vehicle provides marine propulsive power and/or steering control for the utility trailer when underway through water.

It is another object of the present invention to provide a plain and simple land-towable flatbed trailer having traditional utility for hauling conventional items for home, farm, sporting, rural, or recreational use; and yet also provide marine transport of a powered land vehicle.

It is a further object of the present invention to provide an amphibious trailer vehicle that obviates the need for marine registration or licensing for traversing waterways.

It is another object of the present invention to provide a quick and convenient removable coupling between the trailer's marine propulsion and steering with the ferried vehicle's wheel torque and/or steering mechanism in order to "drive" the trailer over water utilizing the power and/or steering of the ferried vehicle.

Advantages over prior systems of providing such an apparatus include obviating a need to license the amphibious trailer as a marine vessel (since it has no onboard engine), providing use and operation as a conventional utility trailer to haul other items over land, and providing an amphibious trailer conveniently controllable by the ferried vehicle, i.e., an ATV, which provides propulsive power and/or steering control.

SUMMARY OF THE INVENTION

In accordance with a first aspect of the present invention, there is provided an amphibious utility trailer adapted to transport an all terrain vehicle (ATV) over land or water comprising a frame including a deck, trailer wheels, and tongue to enable said trailer to be towed over land; a floatation system to provide buoyancy (for said trailer and terrain vehicle) in water, and a propulsor operable to receive power from the ATV in order to propel said trailer when underway in water. The amphibious trailer may also include a rudder operable with a steering mechanism of said terrain vehicle when placed on said trailer to provide marine steering for said trailer. In addition, a drive mechanism may be included to operatively couple at least one drive wheel of the ATV in order to supply power to the propulsor. The drive mechanism may comprise a set of rollers to engage a drive wheel of the ATV, a drive belt to operatively couple the drive rollers and a gear mechanism that supplies torque to the propulsor, which may include one or more paddle wheels, propellers, or water jets.

According to another aspect of the invention, there is provided a land-towable amphibious utility trailer operative to generate marine propulsion from an ATV having a drive wheel, wherein the utility trailer comprises a propulsor to propel said trailer through water in response to torque applied thereto, and a drive coupling to removably couple wheel torque of an ATV drive wheel with the propulsor when positioning the ATV on said trailer.

In yet a further embodiment of the invention, there is provided a land-towable amphibious utility trailer operative to produce marine propulsion and steering capability from an ATV having a drive wheel and a steerable wheel where the utility trailer comprises a propulsor to propel the trailer through water in response to torque applied thereto, a drive coupling to removably couple wheel torque of an ATV drive wheel with the propulsor when positioning the ATV on the trailer, a rudder to steer the trailer in water, and a steering coupling to removably couple a steerable wheel of the ATV with said rudder in order to steer the trailer using a steerable wheel of the ATV. In this embodiment, the propulsor may comprise a paddle wheel and the drive coupling may comprise a set of rollers to removably couple ATV tire torque with a belt drive mechanism of the paddle wheel when positioning ATV drive wheels on the rollers. The propulsor may comprise a propeller and said drive coupling may comprise a set of rollers to removably couple ATV tire torque of the ATV with a gear box that drives the propeller. Alternatively, the drive coupling may comprise a treadmill to removably couple ATV tire torque with a drive mechanism of the paddle wheel. The steering coupling may comprise a rotatable steering plate having a tire receptor to receive a steering wheel of the ATV, and the steering plate may have a cable attachment to rotate said rudder via a cable interconnecting said steering plate and the rudder.

In accordance with yet another aspect of the invention, there is provides an amphibious utility trailer adapted for marine propulsion by an ATV having drive wheels where the utility trailer comprises a propulsor to propel said trailer in water, and a wheel torque coupling disposed on a bed of the trailer to removably couple drive wheel torque of the ATV with the propulsor in order to propel the trailer when underway in water. In this embodiment, the amphibious utility trailer may further include a rudder to steer the trailer in water, and a steering coupling disposed on the trailer bed to removably couple a steerable wheel of the ATV with the rudder.

Other aspect, features, and embodiments of the invention will become apparent upon review of the following description taken with the accompanying drawings. The invention, thought, is pointed out by the appended claims.

DESCRIPTION OF ILLUSTRATIVE EMBODIMENTS

Figure 1:
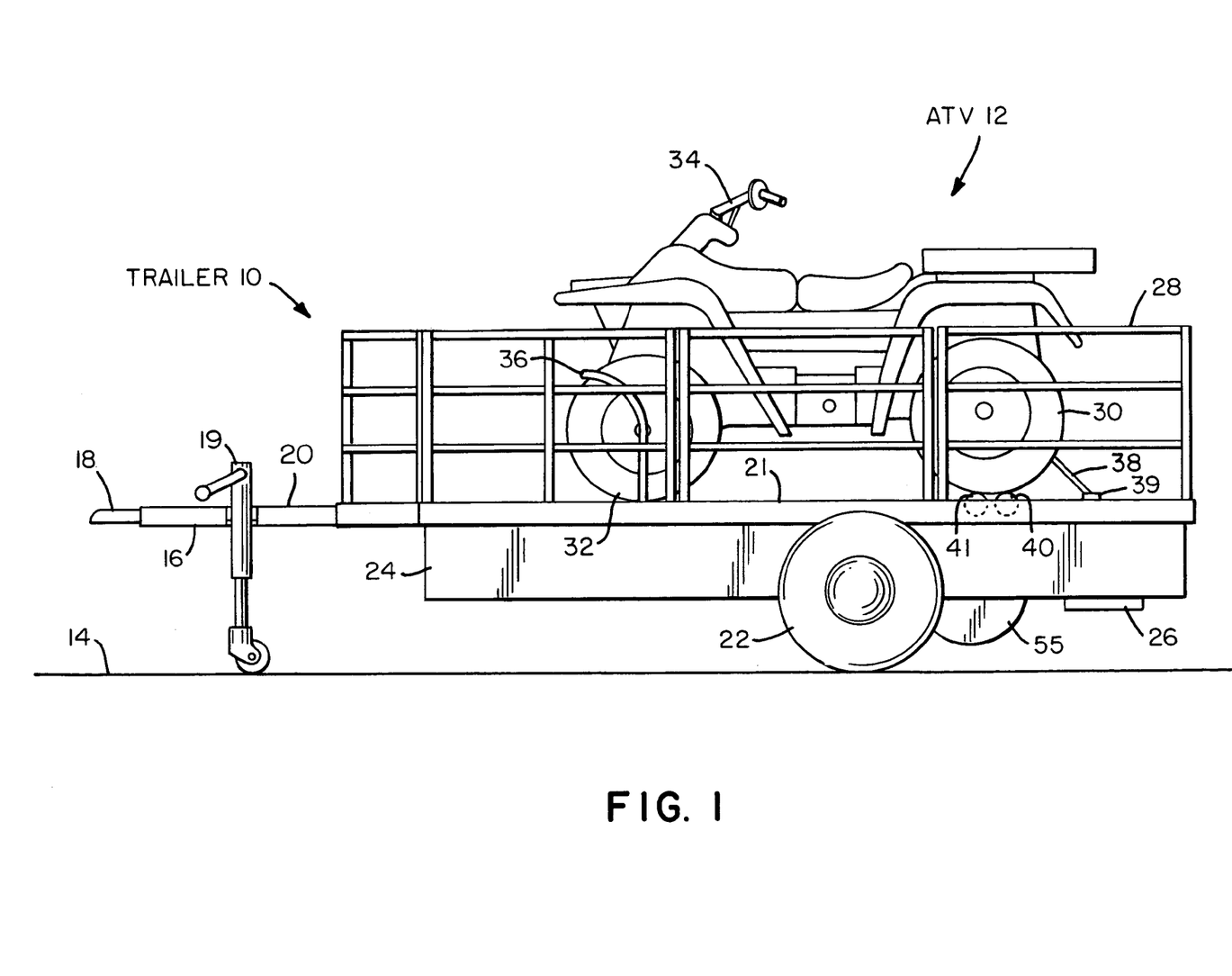
FIG. 1 shows a four-wheeled all terrain vehicle ("ATV") mounted on an amphibious utility trailer for transport over land or water according to the present invention.

FIG. 1 shows a four-wheeled all terrain vehicle ("ATV") mounted on an amphibious utility trailer 10 for transport over land 14. According to the invention, the utility trailer is powered and/or steered through water using ATV-powered propulsion and steering mechanisms so that the trailer's amphibious water operation does not require separate power for marine propulsion or steering. In addition, the land-hauling capability of the trailer for other items is not impaired since the ATV, while positioned on the trailer bed, is removably engaged with propulsion and steering mechanisms of the amphibious trailer. Accordingly, the trailer may advantageously be used for both marine transport and for traditional hauling purposes.

In an exemplary physical construction, trailer 10 includes a tongue 16 having a hitch coupler 18 and tongue jack 19 for attachment to a tow vehicle (not shown), as well as a frame structure 20 that supports trailer wheels 22, a flotation device 24 on each side of the trailer, a rudder 26 to provide marine steering when underway in water, and a conventional railing 28 for maintaining a load (e.g., ATV) on the bed 21 of the trailer. Floatation device 24 may comprise a series of polypropylene or polyethylene pontoons disposed along the underside of frame 20 to provide sufficient buoyancy to support the weight of the trailer 10, ATV 12, and any other desire load at a desired distance above the water line after being launched.

Each floatation device 24 may also be segmented (e.g., two, three, or four separate pieces) and disposed longitudinally along the underside of frame 20. Other buoyant materials or devices may be used, such as Styrofoam-filled aluminum pontoons or other buoyant structure. The frame structure itself may take on any form known in the art, such as an arrangement of aluminum or steel beams or channels, a tubular structure, or a unibody construction of sheet metal. Aluminum is preferred to meet weight limitations, to help obviate requirements such as brakes, and or to meet safety limitations for the tow vehicle. Advantageously, because the amphibious utility trailer has no separate power but is instead powered by the ATV, the invention may obviate the need to register or license the trailer as a marine vessel under any regulatory authority.

ATV 12 includes a pair of drive wheels 30 powered by the ATV's engine and at least one steerable wheel 32 (typically two front steerable wheels) operable by a user with handle bar 34. Tiedowns 38, via deck anchors 39 on each side of trailer bed 21, removably secure rear wheels 30 of ATV 10 upon a set of drive rollers 40 on trailer bed 21. The front of the ATV may be similarly secured to trailer bed 21. To accommodate a four-wheeled ATV, drive rollers 40 and 41 span at least a portion of the width of trailer bed 21 in order to removably engage each rear drive wheel or tire 30 of ATV 12.

When positioned on trailer bed 21, at least one steerable wheel (but preferably both steerable wheels) of ATV 10 is removably secured to a turntable or steering plate (subsequently described) mounted on frame 20 by a wheel cog 36 for each wheel used in the trailer's rudder steering mechanism. Steering plates and drive rollers 40 are longitudinally spaced on trailer bed 21 to match the wheelbase of ATV so that the ATV steerable wheels rest on the steering plates and the ATV drive wheels rest on the drive rollers. Alternatively, a treadmill instead of drive rollers may be employed to obviate this constraint.

Figures 2A, 2B:
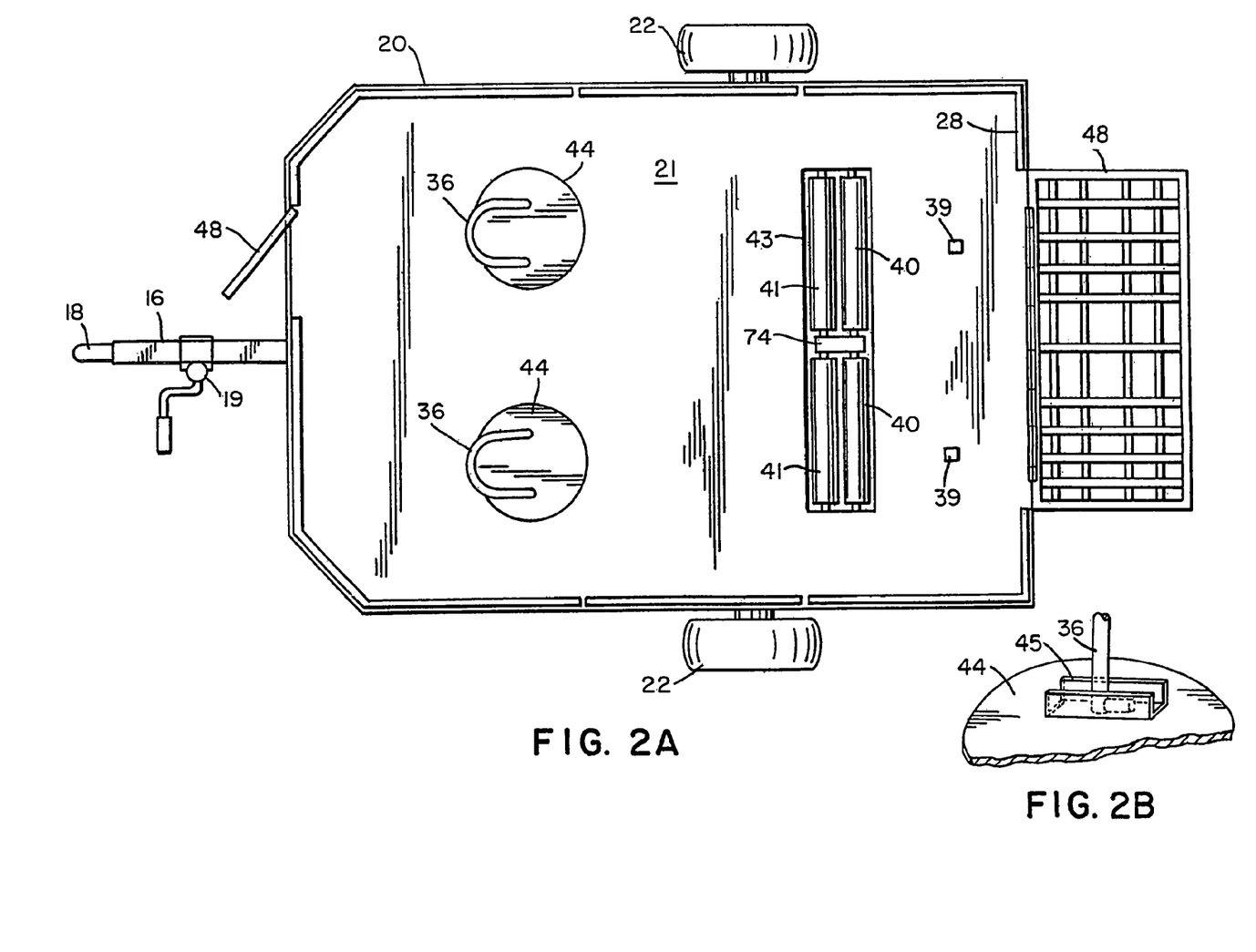
FIG. 2A shows a top view of the illustrative amphibious utility trailer of FIG. 1.
FIG. 2B shows an adjustment mechanism for wheel cogs to position the ATV within a given longitudinal range along the longitudinal length of trailer in order to accommodate an ATV having a longer or shorter wheelbase.

FIG. 2A shows a top view of the illustrative amphibious utility trailer 10 of FIG. 1 wherein like reference numerals indicate like elements. Regarding the torque transfer mechanism to transfer rotational drive torque from the rear ATV drive wheels to the trailer's propulsor (not shown) on the underside of frame 20, it is seen that drive rollers 40 and 41 protrude through a cutout 43 of trailer bed 21 to engage the ATV drive wheels when parked on the trailer bed. An optional steering mechanism enables marine steering of the trailer when underway makes use of the ATV handlebars. To accomplish this, it is seen that wheel cogs 36 removably engage and secure steerable wheels of the ATV to turntables or steering plates 44, which rotate about a vertical axis with rotation of the ATV handlebars 34 (FIG. 1). In one embodiment of the invention, the turn ratio between handlebar rotation and steering plate rotation is about 3:1 to 4:1, which provides a more rapid response when turning the amphibious trailer in water at slower water speeds. Linkage, for example, may be provided by interconnecting a cable between a point located at an outer radial position (e.g., at or near the peripheral edge) of steering plate 44 and a relatively smaller diameter rudder shaft, as subsequently explained. For a given angle of rotation, a relatively smaller angular swing of the steering plate 44 manifests itself in a relatively larger angular swing at the rudder axis. For example, a 22.5° of the ATV handlebars 34, for example, produces a ninety degree rotation of rudder 26. As provided by the appended claims, the invention broadly embraces an amphibious trailer adapted for ATV propulsion where ATV steering is optional. That is, steering may be accomplished by other means, such as, by oppositely engaging individual left and right propulsors using ATV drive power, or even manually by using steering board or rudder-tiller arrangement on the trailer.

FIG. 2A also depicts a ramp gate 46 that pivots upon a hinge of trailer frame 20. This enables an operator to drive the ATV onto and off the trailer. When making landfall, the amphibious trailer is backed into shore to enable the ATV to be driven off the trailer via ramp gate 46 when deployed. On the other hand, when launching the trailer with a tow vehicle, a walk-on/walk-off gate 48 may be provided in the railing 28 at the front of trailer 10 for operator ingress/egress after detaching the trailer from the launch vehicle.

To accommodate the wheelbase of the ATV relative to the position of drive rollers 40 and 41 on trailer bed 21, FIG. 2B shows a channel 45 fixed to turntable 44 to slideable adjust wheel cogs 36 within given longitudinal range along the longitudinal length of trailer 10 in order to accommodate an ATV having a longer or shorter wheelbase. Cog 36 may be slideably fixed to channel 45 by bolting or other type of fastener. Providing a treadmill instead of drive rollers to couple ATV drive power to the trailer, of course, would obviate a need for wheel cog adjustment. In addition, wheel cogs 36 may be removable or collapsible to provide an unobstructed flat trailer bed 21 for other utility purposes or hauling materials.

Figure 3:
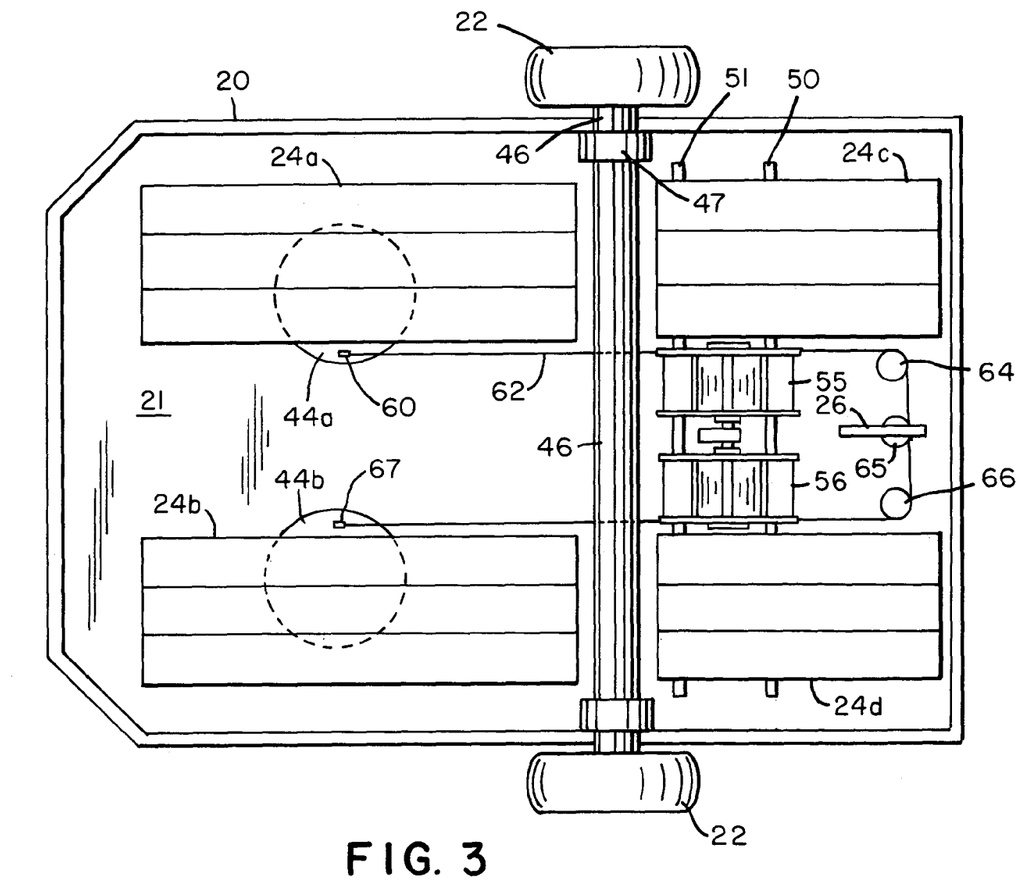
FIG. 3 shows a bottom view of the amphibious utility trailer depicting trailer wheels, an axel, and bearing blocks to support the axel on a frame of the trailer.

FIG. 3 shows a bottom view of the amphibious utility trailer 10, absent the trailer tongue, including trailer wheels or tires 22, an axel 46, and bearing block 47 to support the axel 46 on a frame of the trailer. Pontoons 24a, 24b, 24c, and 24d also attach to the underside of the trailer frame. Shafts 50 and 51, which are rotatably mounted to frame 20, support drive rollers 40 and 41 protruding through trailer deck 21 as previously explained. At least one of the shafts 50, 51 mechanically couples a pulley/drive belt assembly to supply rotational torque to paddle wheels 55 and 56, as subsequently explained. Steering plate 44a includes a cable attachment 60 attached to cable 62, which extends to the rear of trailer 10 to a guide wheel 64, thence around a shaft 65 of rudder 26, and thence around guide wheel 66 before returning to a cable attachment 67 of steering plate 44b. Cable 62 makes several wraps around rudder shaft 65 to reduce slippage. Spring tensioning may also be provided for cable 62. Cable guides may also be provided in cross member structures of frame 20 to maintain proper alignment. According to the illustrated arrangement, it is seen that rotation of steering plates, as previously explained, also rotates rudder 26 upon its shaft 26 in order to provide marine steering through water after launching the trailer.

Figure 4A:
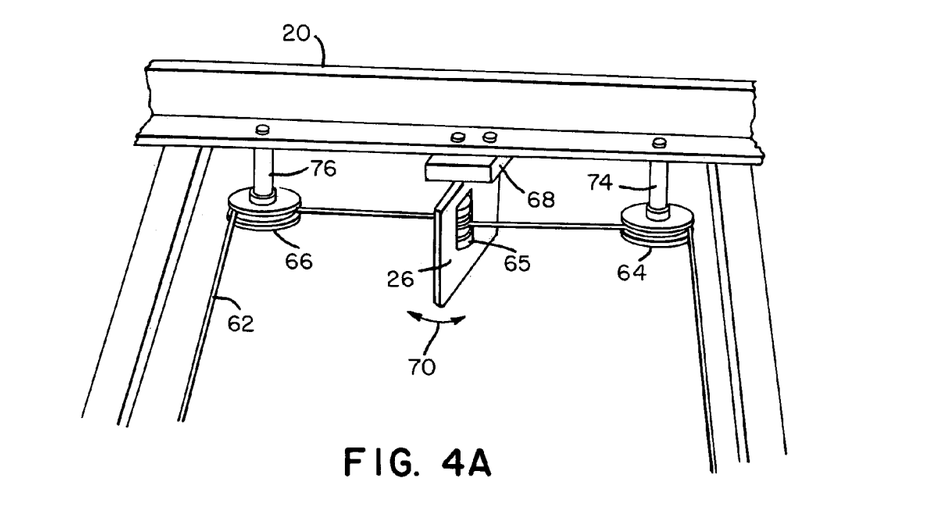
FIGS. 4A, 4B, and 4C show details of an exemplary, optional steering mechanism for the amphibious utility trailer according to the present invention.
Figure 4B:
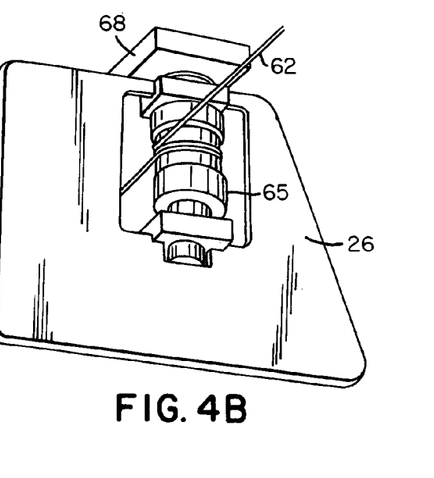
Figure 4C:
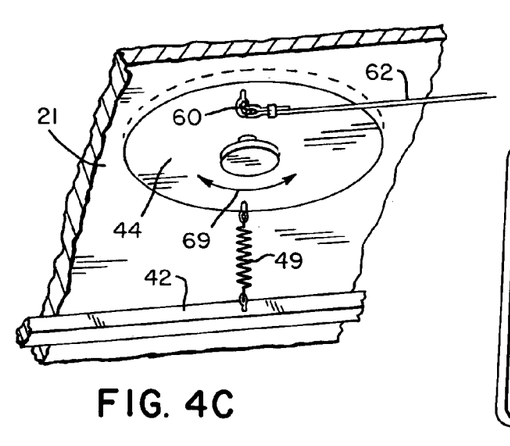

FIGS. 4A, 4B, and 4C show details of an exemplary, optional steering mechanism for the amphibious utility trailer. In FIG. 4A, there are shown cable guide rollers 64 and 66 rotatably mounted on respective shafts 74 and 76 that are affixed to frame 20 to guide cable 62 from the steering plates to the rudder shaft 65. The guide rollers redirect rotational translation of the steering plates to the rudder shaft 65. A rudder mount and bearing block 68 rotatably fixes the rudder shaft 65 to frame 20. A turnbuckle (not shown) may also be provided in cable 62 to adjust tensioning thereof. FIG. 4B shows cable 62 encircling rudder shaft 65 two or three times in order to provide increased frictional grip to turn the rudder against hydrodynamic forces of the water when the trailer is underway. The portion of rudder shaft 65 encircled by cable 62 preferably comprises a bronze material whereas the cable itself may be stainless or non-corrosive steel or other material. Rudder 26 comprises aluminum in one embodiment of the invention. FIG. 4C shows the underside of steering plate 44 within a cutout of deck 21. As seen, cable 62 attaches to an eyebolt 60 fixedly mounted in the steering plate. Angular rotation of steering plate 44 in opposed directions indicated by arrow 69 effects opposed rotations of rudder 26 about its shaft 65, as indicate by arrow 70 (FIG. 4A). The angular position of steering plate 44 is also spring-loaded to maintain a neutral position using spring 49 tied to a portion 42 of the trailer frame. As explained above, other steering mechanisms may be provided, including manual steering of trailer when underway. These include, but are not limited to, providing asymmetric propulsion or thrust to effect marine steering, providing directed or steerable propulsors or thrusters, or providing a manual or tiller-operated steering board or rudder. These other mechanism may be manually operated independently of the ATV, or they may be operated using the ATV handlebars.

Figure 5:
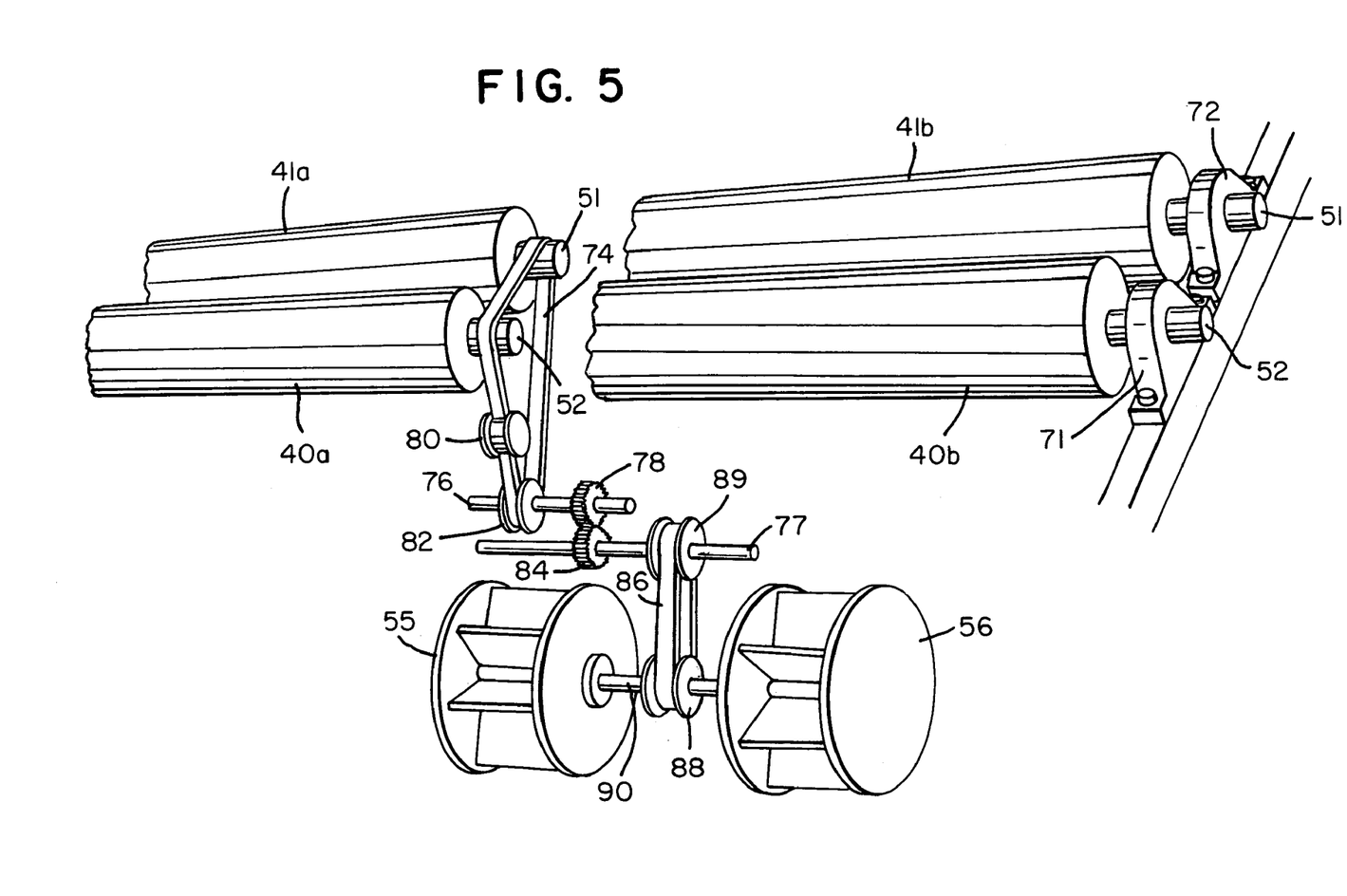
FIG. 5 shows an exemplary drive mechanism, e.g., drive rollers, to transfer rotational torque or engine power from the ATV drive wheels to a propulsor, e.g., aluminum paddles wheels of the amphibious utility trailer.

FIG. 5 shows an exemplary drive mechanism, e.g., drive rollers, to transfer rotational torque or engine power from the ATV drive wheels to a propulsor, e.g., aluminum paddles wheels 55, 56, of the amphibious utility trailer. Instead of rollers, a treadmill or other mechanism may be employed. In the illustrative drive roller embodiment, at least one pair of drive rollers 40a and 40b frictionally bears against rear rubber tires of the ATV to drive a flexible (e.g. rubber) belt 74 around pulley 82 of shaft 76. Shaft 76 also has a gear 78 that engages the teeth of a reversing gear 84 in order to spin shaft 77 in reverse direction. Drive rollers 40 and 41 are respectively supported by frame 20 via bearing blocks 71 and 72. Shafts 51 and 52 for respective pairs of drive rollers 40a, 40b and 41a, 41b may be integrated together in a single shaft where drive torque of each ATV drive wheel is combined, or the shafts 51 and 52 may be segmented as shown where each ATV drive wheel separately provides drive torque.

A tension pulley 80, via spring-loaded pulley shaft (not shown), maintains tensioning of belt 74 against drive pulley 82 and shafts 51, 52 of the drive rollers. A secondary toothed gear 84 reverses the direction of rotation of shaft 77 relative to shaft 76 in order to rotate paddle wheels 55, 56 in a direction that corresponds with forward motion of the ATV. Shaft 77 is driven by secondary gear 84 to drive pulleys 88 and 89 to supply drive power to shaft 90 via a secondary flexible drive belt 86. Pulley 88 directly couples shaft 90, which are interlocked with the paddle wheels 55 and 56. According to the arrangement shown, throttling the ATV power increases drive wheel rotation. This in turn, increases the rotational speed of paddle wheels 55, 56 to drive the amphibious trailer when underway. Conventional bearing blocks and bearings to support the various shafts, gears, and pulleys are not shown, it being understood that these are well known in the art. Furthermore, other drive mechanisms (e.g., propellers, water jet propulsors, etc.) may be substituted for the illustrated embodiment.

Figure 6:
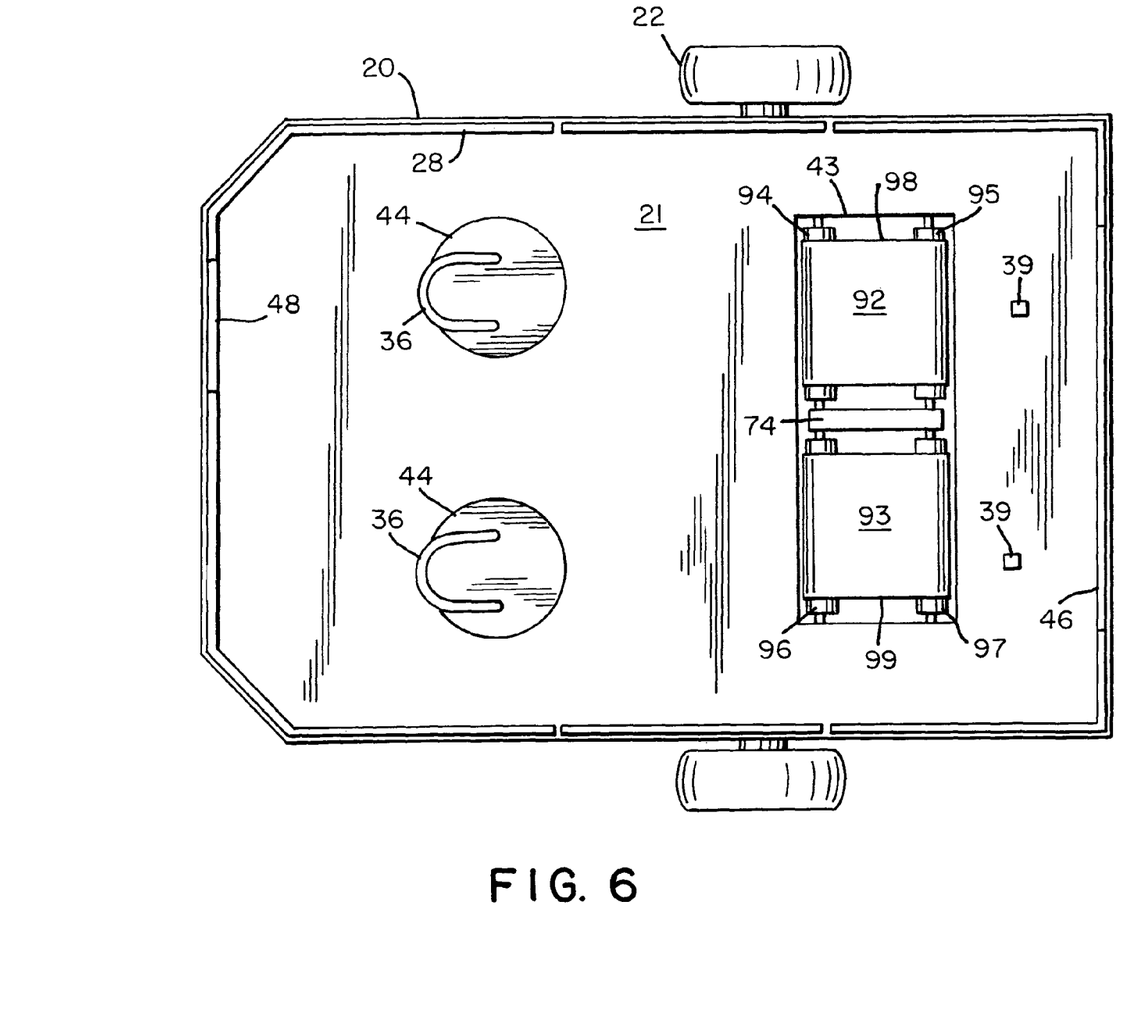
FIG. 6 shows an alternative coupling mechanism between ATV drive power and the trailer's propulsor, which employs treadmills instead of roller pairs to removably couple ATV drive power to the amphibious utility trailer.

FIG. 6 shows an alternative coupling mechanism between ATV drive power and the trailer's propulsor, which employs treadmills instead of roller pairs to removably couple ATV drive power to the amphibious utility trailer. Treadmill 98 rotates around rollers 94 and 95 whereas treadmill 99 rotates around rollers 96 and 97. A larger cutout 43 in trailer bed 21 accommodates the treadmills. ATV drive wheels respectively engage the surfaces 92 and 93 of treadmills 98 and 99 when positioned on the trailer bed 21. Surfaces 92 and 93 are rigidly under-supported in order to support the weight of the ATV. As the ATV rear tires rotate, so does drive a belt 74, which is operatively coupled to a propulsor as described above. Using treadmills, longitudinal placement of the steering plates and drive couplings on the trailer bed relative to the ATV wheelbase is not so critical in order to accommodate the ATV's wheel base when employing both the drive power coupling and steering options for an amphibious utility trailer. Drive rollers, however, are less costly.

Based on the foregoing illustrative embodiments, it will be appreciated that alternative features, mechanisms, and structure may be employed by skilled artisans to achieve the objects and principles of the invention. Removable coupling may be configured for any motorized vehicle, including a three-wheeled or two-wheel vehicle (i.e., motorcycle). Removable couplings for torque and/or steering control may be frictional or mechanical (e.g., intermeshing gears may be used instead of rollers or a treadmill). Marine steering mechanism may comprise a steering board, rudder, asymmetric propulsion, or directed (e.g., steerable) propulsion. Materials may be substituted, mechanical couplings may be varied or substituted, and various types of propulsors (e.g., paddle wheels, propellers, waterjets, etc.) may be used. Accordingly, it is intended to include within the scope of the invention all such variations, modifications, adaptations as may come to those skilled in the art based on the teachings herein.

I claim:

1. An amphibious utility trailer adapted to transport a light load over land and to transport an all terrain vehicle (ATV) over land or water and that enables drive-on loading of said ATV from land while attached to a towing vehicle and back-down water-launching of said trailer/ATV while attached to said towing vehicle, said utility trailer comprising:
   a frame having a front end and a rear end, said front end serving as a bow and said rear end serving as a stern during water transport,
   a tongue affixed to said front end of said frame to enable land-towing,
   a substantially flat and unobstructed deck mounted on a top of said frame to enable hauling of said light load,
   a railing system extending around a periphery of said substantially flat deck that includes a walk-off gate positioned near said front end of said frame to enable ingress/egress of personnel during said water launching while said trailer is attached to said towing vehicle and an ATV drive-off gate positioned near said rear end of said frame to enable land loading/unloading of said ATV while said trailer is attached to said towing vehicle,
   a drive-off ramp mounted near said rear end of said trailer to enable said ATV to drive on and off said trailer when attached to said towing vehicle,
   an axel mounted on an underside of said frame for carrying a pair of wheels and positioned at a fore-aft location between said front and rear ends of said frame to enable water-launching of said trailer via said tongue when attached to a towing vehicle, each of said wheels being positioned on a respective side of said frame,
   a floatation system to provide buoyancy in water, said floatation system including a series of individual buoyancy segments mounted on the underside of said frame in front of and behind said axel, and
   a propulsor positioned near the rear end of said frame opposite said tongue, said propulsor being operable to receive power from said ATV to propel said utility trailer through water in a direction of said tongue.

2. The amphibious utility trailer of claim 1, further comprising:
   a rudder operable with a steering mechanism of said ATV when ferried by the trailer in order to provide marine steering.

3. The amphibious utility trailer of claim 2, further including:
   a friction drive mechanism to operatively couple torque of at least one drive wheel of the ATV with the propulsor in order to propel the trailer through water.

4. The amphibious utility trailer of claim 3, wherein said drive mechanism comprises a set of drive rollers to engage a drive wheel of the ATV, a drive belt to operatively couple the drive rollers to a gear mechanism that supplies torque to the propulsor.

5. The amphibious utility trailer of claim 4, wherein said propulsor comprises at least one paddle wheel.

6. The amphibious utility trailer of claim 3, wherein said drive mechanism comprises a treadmill.

7. The amphibious utility trailer of claim 4, wherein said propulsor comprises a propeller.

8. The amphibious utility trailer of claim 3, further including:
   a steering coupling operable with at least one steerable wheel of the ATV in order to rotate said rudder by steering the ATV.

9. The amphibious utility trailer of claim 8, wherein the steering coupling comprises a steering plate removably interlocked with said steerable wheel and operative to rotate the rudder in response to steering the steerable wheel of the ATV.

10. The amphibious utility trailer of claim 9, wherein said steering plate multiplies a turn ratio of the rudder relative to the steerable wheel of the ATV.

11. A land-towable amphibious utility trailer operative to generate marine propulsion from an ATV having at least one drive wheel, said utility trailer having front and rear ends respectively serving as a bow and stern when propelled over water and being adapted to enable land-loading said ATV while attached to a towing vehicle and back-down water launching of said trailer/ATV while attached to said towing vehicle, said utility trailer comprising:
   a frame defining said front and rear ends,
   a tongue affixed to the front end of said frame to enable land-towing of said trailer and back-down water-launching of said trailer while attached to said towing vehicle,
   a substantially flat and unobstructed deck mounted on a top of said frame,
   a barrier extending around a periphery of said deck that includes a ramp segment near said rear end of said frame to enable said ATV to drive-on and drive-off said trailer while attached to said towing vehicle,
   an axel mounted on an underside of said frame for carrying a pair of wheels, each being positioned on a respective side of said frame,
   a floatation system to provide buoyancy in water, said floatation system including a series of individual buoyancy segments mounted on the underside of said frame,
   a propulsor to propel the trailer through water in response to torque applied thereto, and
   a drive coupling to removably couple wheel torque of a drive wheel of the ATV with the propulsor when the ATV is positioned on said trailer.

12. The land-towable amphibious utility trailer of claim 11, further comprising:
   a marine steering mechanism, and
   a steering coupling to operatively couple a steering wheel of the ATV with said steering mechanism in order to steer the amphibious utility trailer when underway in water.

13. A land-towable amphibious utility trailer operative to produce marine propulsion and to provide steering capability from an ATV, said ATV having at least one drive wheel and at least one steerable wheel, said utility trailer being adapted to enable ATV drive-on and drive-off while attached to a towing vehicle and back-down water-launching of said trailer while still attached to said towing vehicle, said utility trailer comprising:

a frame having a front end and rear end respectively define a bow and a stern, a tongue affixed to the front end of said frame to enable land-towing of said trailer, a substantially flat and unobstructed deck mounted on a top of said frame, a barrier extending around a periphery of said deck that includes a walk-off gate near said front end to enable personnel ingress/egress during back-down water-launching of said trailer while attached to said towing vehicle and a ramp segment near the rear end of said frame to enable ATV drive-on from land while attached to said towing vehicle, an axel mounted on an underside of said frame for carrying a pair of wheels, each being positioned on a respective side of said frame, a floatation system to provide buoyancy in water, said floatation system including a series of individual buoyancy segments mounted on the underside of said frame, a propulsor to propel said trailer through water in response to torque applied thereto, a drive coupling to removably couple wheel torque of an ATV drive wheel with the propulsor when positioning the ATV on the trailer, a steering mechanism to steer the trailer in water, and a steering coupling to removably couple a steerable wheel of the ATV with the steering mechanism in order to steer the trailer using a steerable wheel of the ATV.

14. The invention of claim 13, wherein said propulsor comprises a paddle wheel and said drive coupling comprises a set of rollers to removably couple ATV tire torque with a belt drive mechanism of said paddle wheel upon positioning ATV drive wheels on said rollers.

15. The invention of claim 13, wherein said propulsor comprises a propeller and said drive coupling comprises a set of rollers to removably couple ATV tire torque with a gear that drives the propeller.

16. The invention of claim 13, wherein said drive coupling comprises a treadmill to removably couple ATV tire torque with a drive mechanism of said paddle wheel.

17. The invention of claim 13, wherein said steering coupling comprising a rotatable steering plate having a tire receptor to receive a steering wheel of the ATV, said steering plate having a cable attachment to rotate said rudder via a cable interconnecting said steering plate and said rudder.

18. The invention of claim 17, wherein said tire receptor comprises a wheel cog to clamp a steerable wheel of said ATV.

19. The invention of claim 13, wherein said steering coupling comprises a tire receptor that operatively engages a tire of said steering wheel, said tire receptor being operatively connected with said rudder to effect steering of said trailer when underway in water.

20. An amphibious utility trailer adapted for marine propulsion by an ATV having drive wheels, said utility trailer being adapted to enable ATV drive-on and drive-off while attached to a towing vehicle and back-down water-launching of said trailer while still attached to said towing vehicle, said utility trailer comprising:

a frame defining a front end and a rear end that respectively serve as a bow and stern when underway over water, a tongue affixed to the front end of said frame to enable land-towing and back-down water-launching of said trailer, a substantially flat and unobstructed deck mounted on a top of said frame, a cargo barrier extending around a periphery of said deck that includes a walk-off gate near the front end of said trailer to enable personnel to ingress/egress during a water-launching event of said trailer while attached to said towing vehicle and a ramp segment near the rear end of said trailer to enable said ATV to drive-on and drive-off said trailer while attached to said towing vehicle, an axel mounted on an underside of said frame for carrying a pair of wheels, each being positioned on a respective side of said frame, a floatation system to provide buoyancy in water, said floatation system including a series of individual buoyancy segments mounted on the underside of said frame, a propulsor to propel said trailer in water, and a wheel torque coupling disposed on a bed of the trailer to removably couple drive wheel torque of the ATV with the propulsor in order to propel the trailer through water.

21. The amphibious utility trailer of claim 20, wherein said ATV further includes a steerable wheel and said trailer includes:

a steering mechanism to steer the trailer in water, and a steering coupling disposed on the trailer bed to removably couple the steerable wheel of the ATV with said steering mechanism.

* * * * *